US008484324B2

(12) United States Patent
Hegde et al.

(10) Patent No.: US 8,484,324 B2
(45) Date of Patent: Jul. 9, 2013

(54) METHOD AND APPARATUS FOR DIAL PLAN DEBUGGING

(75) Inventors: Prashant P. Hegde, Bangalore (IN); Shiva Shankar J., Banglore, IN (US)

(73) Assignee: Cisco Technology, Inc., San Jose, CA (US)

( * ) Notice: Subject to any disclaimer, the term of this patent is extended or adjusted under 35 U.S.C. 154(b) by 1591 days.

(21) Appl. No.: 11/270,958

(22) Filed: Nov. 10, 2005

(65) Prior Publication Data

US 2007/0106807 A1    May 10, 2007

(51) Int. Cl.
*G06F 15/16* (2006.01)

(52) U.S. Cl.
USPC .......................................... 709/223

(58) Field of Classification Search
USPC .................. 709/223, 202, 204; 707/10
See application file for complete search history.

(56) References Cited

U.S. PATENT DOCUMENTS

| | | | | |
|---|---|---|---|---|
| 5,390,242 A * | 2/1995 | Bales et al. | | 379/220.01 |
| 5,675,741 A * | 10/1997 | Aggarwal et al. | | 709/242 |
| 5,870,559 A * | 2/1999 | Leshem et al. | | 709/224 |
| 6,144,962 A * | 11/2000 | Weinberg et al. | | 707/10 |
| 6,154,448 A * | 11/2000 | Petersen et al. | | 370/248 |
| 6,237,006 B1 * | 5/2001 | Weinberg et al. | | 707/103 R |
| 6,295,518 B1 * | 9/2001 | McLain et al. | | 703/23 |
| 6,341,310 B1 * | 1/2002 | Leshem et al. | | 709/223 |
| 6,370,119 B1 * | 4/2002 | Basso et al. | | 370/252 |
| 6,470,383 B1 * | 10/2002 | Leshem et al. | | 709/223 |
| 6,549,944 B1 * | 4/2003 | Weinberg et al. | | 709/224 |
| 6,570,867 B1 * | 5/2003 | Robinson et al. | | 370/351 |
| 6,571,272 B1 * | 5/2003 | Ferguson et al. | | 709/200 |
| 6,578,087 B1 * | 6/2003 | Garakani et al. | | 709/242 |
| 6,785,735 B2 * | 8/2004 | Garakani et al. | | 709/238 |
| 6,823,479 B1 * | 11/2004 | McElhaney et al. | | 714/43 |
| 6,900,822 B2 * | 5/2005 | Germain et al. | | 715/736 |
| 7,237,138 B2 * | 6/2007 | Greenwald et al. | | 714/4 |
| 7,248,682 B1 * | 7/2007 | Oran | | 370/395.52 |
| 2002/0116487 A1 * | 8/2002 | Iseda et al. | | 709/223 |
| 2003/0020764 A1 * | 1/2003 | Germain et al. | | 345/853 |
| 2003/0081125 A1 * | 5/2003 | Sheldon et al. | | 348/180 |
| 2003/0086425 A1 * | 5/2003 | Bearden et al. | | 370/392 |
| 2003/0112764 A1 * | 6/2003 | Gaspard et al. | | 370/252 |
| 2003/0145105 A1 * | 7/2003 | Desineni et al. | | 709/238 |
| 2004/0030741 A1 * | 2/2004 | Wolton et al. | | 709/202 |
| 2004/0034714 A1 * | 2/2004 | Garakani et al. | | 709/238 |
| 2004/0073658 A1 * | 4/2004 | Oran et al. | | 709/224 |

(Continued)

OTHER PUBLICATIONS

Willis and Hoeneisen. "Session Initiation Protocol (SIP) Extention Header Field for Service Route Discovery During Registration". RFC 3608. Oct. 2003.*
Rosenberg, Schulzrinne, Camarillo, Johnston, Peterson, Sparks, Handley, and Schooler. "SIP: Session Initiation Protocol". RFC 3261. Jun. 2002.*

*Primary Examiner* — Scott Christensen
(74) *Attorney, Agent, or Firm* — Fish & Richardson P.C.

(57) ABSTRACT

A method, system and apparatus for dial plan debugging are provided in the invention. The method includes hop-by-hop debugging of large inter-networks. Information related to a next hop is received at each hop. A set of results, based on this information, including the route pattern of a call, is displayed. The displayed information indicates nodes at which the call may fail. Back-routing of the call in case the call may fail is also described.

17 Claims, 5 Drawing Sheets

U.S. PATENT DOCUMENTS

| | | | |
|---|---|---|---|
| 2004/0252646 A1* | 12/2004 | Adhikari et al. | 370/252 |
| 2005/0036487 A1* | 2/2005 | Srikrishna | 370/389 |
| 2005/0039132 A1* | 2/2005 | Germain et al. | 715/736 |
| 2005/0163311 A1* | 7/2005 | Fowler et al. | 379/900 |
| 2005/0180447 A1* | 8/2005 | Lim et al. | 370/432 |
| 2005/0228880 A1* | 10/2005 | Champlin | 709/224 |
| 2005/0278440 A1* | 12/2005 | Scoggins | 709/223 |
| 2006/0168206 A1* | 7/2006 | Choong et al. | 709/224 |

* cited by examiner

METHOD AND APPARATUS FOR DIAL PLAN DEBUGGING

BACKGROUND OF THE INVENTION

1. Field of Invention

Embodiments of the invention relate in general to the field of network telephony. More specifically, embodiments of the invention relate to methods and systems for call management in the field of network telephony.

2. Description of the Background Art

The Internet is used for telephony in addition to data transfer. To transmit voice via the Internet, sound signals at the sender's end are digitized and divided into small data packets. A stream of such data packets is sent to a destination through a packet-switching data network. The received digitized sound signals are converted back into analog signals at the destination.

In a conventional technique, management of the network telephony system includes the configuration of dial plans for calls to various locations. The configuration involves a level of control, using an ordered list of partitions that users can look at before placing a call. A partition comprises a logical grouping of Directory Numbers (DNs) and route patterns with similar reachability characteristics. The ordered list of partitions provides the source and destination. Dial plans are used to define a number prefix that carries specific significance. For example, if a user dials a number prefixed by a 9 it could mean an external call or if a user dials 9 followed by 0 it could mean that it is a long distance call. Since this is fundamental to the ability of the users to make calls it needs to be accurate at an end-to-end level. However, this configuration introduces a number of sites, providers and redundancy configurations. Therefore, it becomes difficult to debug a call, when one of these configurations breaks.

In another conventional technique, a dial plan is analyzed for management of network telephony system. The dial plan is an addressing method defined by a network administrator. However, analyzing the dial plan is restricted to a cluster. This restriction makes troubleshooting problems in dial plan configuration across multiple call agents difficult. Further, in Internet Protocol (IP) gateway scenarios, numbers are translated into Uniform Resource Identifiers (URIs). Debugging and tracing the locations in the routing network where the calls fail is hindered when the numbers are translated into URI. Current tools address this at a single system level, however, the end-to-end plan management is still manual and requires tedious labor.

Yet another conventional technique traces the path of a call. In this case, a global call id is inserted in the call-signaling messages, which alerts the systems to send troubleshooting information to the Network Managing Station (NMS). However, the process of tracing the path of the call is restricted only to active calls, and the technique cannot be used in pre-deployment scenarios. This is an intrusive means of testing the signaling linkage of a dialed number.

DETAILED DESCRIPTION OF EMBODIMENTS OF THE INVENTION

Various embodiments of the invention provide methods, systems and computer program products for dial plan debugging. Various embodiments of the invention also provide a method that enables dial plan debugging of a call to be made via a network. Each of the source and destination nodes for the call has a unique logical number as its address. In accordance with various embodiments of the invention the logical number is a phone number or a Uniform Resource Locator (URL) identifier. The dial plan of the call to be initiated can be debugged by entering the source and destination numbers in a Network Management System (NMS). The NMS is a combination of hardware and software that is used to monitor and administer a network or a portion of a network. The NMS receives information from a set of intermediary nodes known as hops. A hop is an intermediary node that carries signaling information and transforms the number to suit the next hop that is being traversed. The signaling information includes tags identifying if a hop can transfer the signaling information to the next hop.

A set of results is displayed, based on the information received from each hop. The displayed set of results is then used to debug the dial plan. Debugging involves searching for problems faced in a call set-up in accordance with various embodiments of the invention. These problems may be encountered during the transfer of data packets, related to the call. In accordance with an embodiment of the invention, debugging involves searching and eliminating problems in a call set-up, which may be faced during the transfer of data packets related to the call. For example, a call agent may be unable to resolve the path for the transfer of data packets. Various embodiment of the invention transmit signaling information through the call set-up for debugging. The call agent of the above example would not be able to resolve a path for the transfer of signaling information. In such cases, debugging would include identifying the call agent that was unable to resolve the path and would further include providing an alternative route. In accordance with various embodiments of the invention, the displayed set of results is used for back routing calls. Back routing calls is selecting an alternative path for the call when the original route is unavailable, or when the call is deemed to be not routable at a hop.

Figure 1:
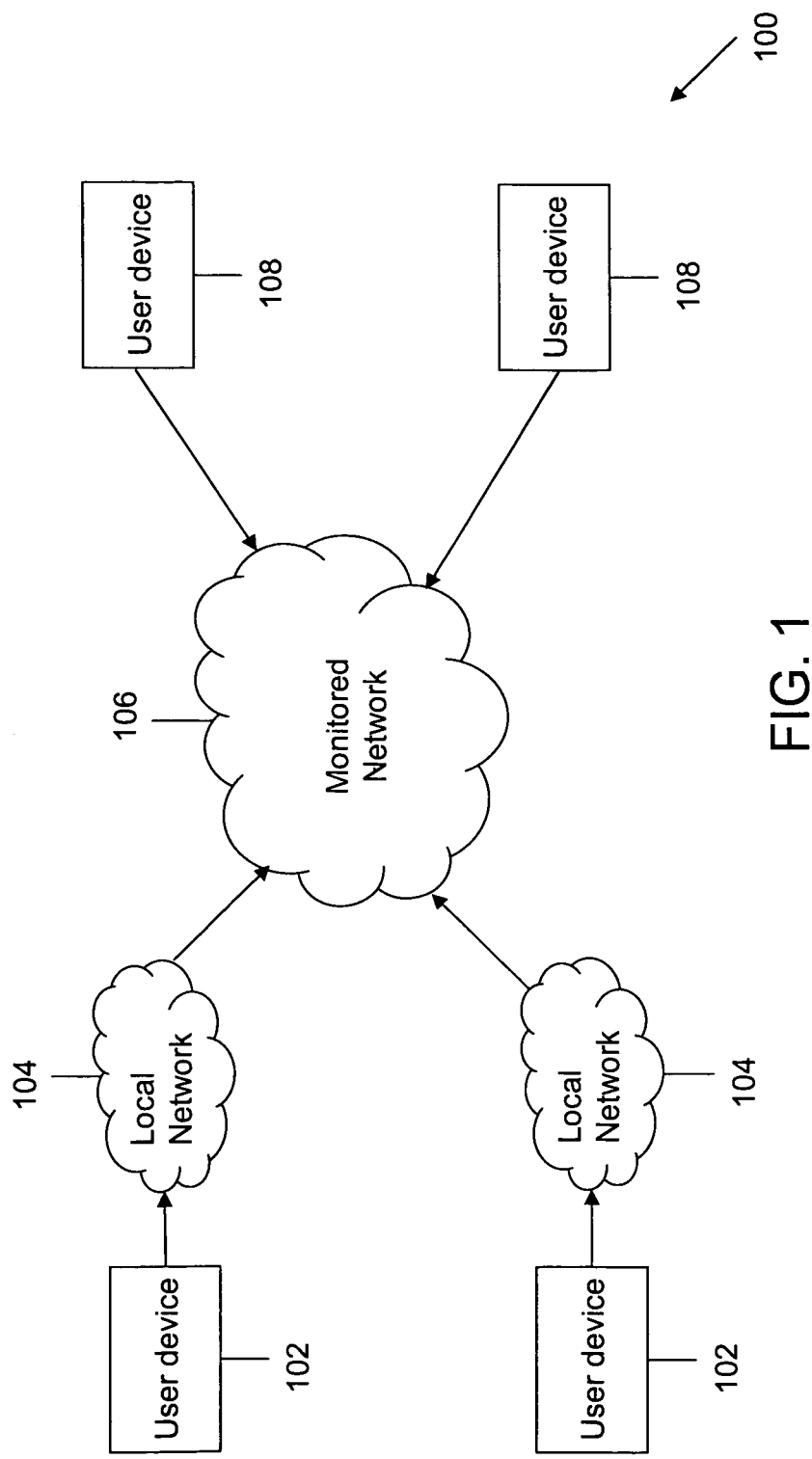
FIG. 1 illustrates a network environment in which various embodiments of the invention can be implemented.

FIG. 1 illustrates a network environment 100, in accordance with various embodiments of the invention. Network environment 100 includes a plurality of user devices 102. User devices 102 provide communication services. The communication services include, but are not restricted to, an exchange of audio and video data. User device 102 may be, for example, Internet Protocol (IP) telephony devices, computers, wireless communication devices, personal digital assistants (PDAs), and other such devices. User devices 102 are connected via local networks 104. Examples of local networks 104 include, but are not limited to, a LAN and an intranet. Further, local networks 104 comprise other network elements, such as supporting devices providing services for effective routing of data packets, in accordance with an embodiment of the invention. The services comprise, for example, call management, call debugging, setting of the route plans, and managing quality over voice. User devices 102 are interfaced with the supporting devices, such as voice gateways and gateway controllers.

Local networks 104 are connected via a monitored network 106. Monitored network 106 may be a collection of local networks 104, interconnected to each other and functioning as a single large network. Monitored network 106 more specifically includes a singular or composite network that provides an infrastructure for substantially real-time, semi-real-time or non-real-time applications. Examples of composite networks include hybrid and multi-domain networks. Examples of monitored network 106 include, but are not limited to, the Internet, a Local Area Network (LAN), a Wide Area Network (WAN), a Metropolitan Area Network (MAN), and a Virtual Private Network (VPN).

Further, some of user devices 102, hereinafter referred to as user devices 108, provide services for the effective routing of data packets related to the call. Network 100 includes user devices 108 that are directly connected to monitored network 106, in accordance with an embodiment of the invention.

Figure 2:
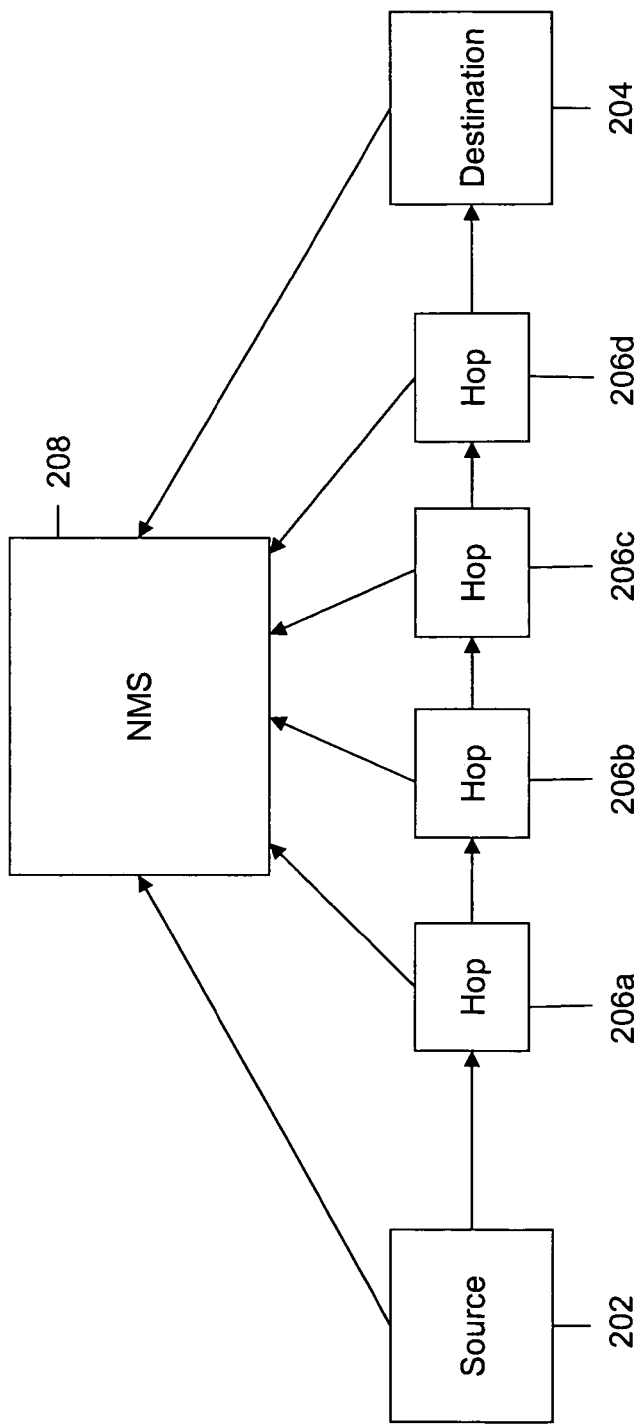
FIG. 2 illustrates the receipt of information from a set of hops, in accordance with an embodiment of the invention.

FIG. 2 illustrates a user device 102 acting as a source 202 and a user device 102 acting as a destination 204, connected via network 100, in accordance with an embodiment of the invention. When a call is made through a network, the call is initiated at a node, such as one of user devices 102, referred to as source 202. The call initiated at source 202 is made to a node, such as one of user devices 102, referred to as destination 204. Destination 204 receives the call made by source 202 if the call is successful. A stream of the data packets related to the call is sent to destination 204 via a route containing a plurality of hops 206a, 206b, 206c, and 206d included in network 100. The call is successful if the data packets are transferred successfully between source 202 and destination 204. Networks are becoming increasingly reliable, yet, a device fault may occur, leading to call failures. Therefore, embodiments of the invention relate to debugging of a call before it is initiated. The data transferred is signaling data that is sent to various entities in the process of call setup in the invention. The receipt of information about a call to be initiated is illustrated with the help of FIG. 2, in accordance with various embodiments of the invention.

The unique numbers of source 202 and destination 204 are provided in a Network Management System (NMS) 208. NMS 208 determines the IP address of the call agent of a first hop 206a. NMS is setup with a list of Call Managers and Switches. User devices 102 are connected to the switch and registered to the respective call manager. The discover process involves querying the Call Managers and the Switches using SNMP, collecting the information, and correlating it. This provides the complete details of every user device. This includes, IP address, MAC address of the user device, and the IP address of the first hop call manager. NMS 208 contacts the call agent of first hop 206a by using its IP address. Every hop implements a software module, which accepts the source and destination numbers and provides information, such as the transformed source and destination numbers to be presented to a next hop. It also provides the IP address of the next hop. In accordance with an embodiment of the invention it provides an exchange ID as in case of traditional telephony. It further provides details of the route patterns and associated data that is useful to locate any problems with the dial plan logic. Any transforms that may be performed on the number are carried out and the transformed number is returned. NMS 208 contacts the call agent of first hop 206a by using its IP address and receives the information. NMS 208 contacts the call agent of a next hop from one of the plurality of hops 206a, 206b, 206c, and 206d at the IP address and port provided by first hop 206a. The procedures carried out for first hop 206a are repeated for the next hop from one of the plurality of hops 206a, 206b, 206c, and 206d and is recursively continued until either destination 204 is detected, or a hop from which the call deemed as not routable is detected. All the results are collated and displayed at NMS 208. This provides various details of a path that a call may take. This can reveal problems with dial plans at any call agent in a distributed network.

The call is deemed as not routable when the information related to the next hop is not received by NMS 208. The call is not routable due to one or more reasons, such as a device failure, link failures or routing instabilities.

Figure 3:
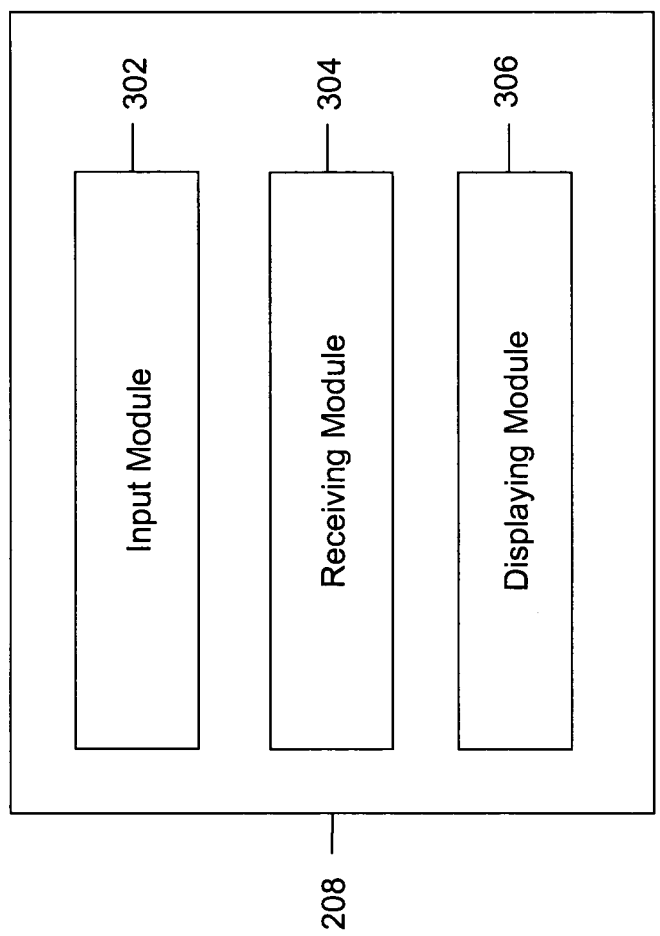
FIG. 3 illustrates various modules of a managing device, in accordance with an embodiment of the invention.

FIG. 3 illustrates various modules in NMS 208, in accordance with an embodiment of the invention. NMS 208 includes an input module 302, a receiving module 304 and a displaying module 306. Source 202 and destination 204 numbers are entered into input module 302. Input module 302 is a combination of software and hardware, in accordance with various embodiment of the invention. Input module 302 may, for example, include a number pad for entering numbers. Receiving module 302 receives information related to the transformed source and destination numbers to be presented to a next hop and the IP address of the next hop. It further receives details of the route patterns and associated data that is useful for locating problems in the dial plan logic.

Displaying module 304 displays the set of results and information received in the form of a route pattern. This route pattern provides a structure that is implemented for layering and ordering the route components, which are implemented while the data packets are transferred. The route pattern displayed may provide a graphical representation of the path a call takes. In addition, the plurality of hops 206a, 206b, 206c and 206d are displayed. A destination number corresponding to destination 204 is displayed, in accordance with an embodiment of the invention. If the destination number is transformed to a Uniform Resource Identifier (URI), as in H.323 and Session Initiation Protocol (SIP) inter-working, the transformed number is displayed. An URI is an address that identifies a device on the Internet or a private network. H.323 is a standard approved by the International Telecommunications Union (ITU) that defines how audio-visual conferencing data is transmitted across networks. SIP is a signaling protocol for Internet telephony and conferencing. The destination number is transformed on the basis of a set of call-routing rules, which comprises but is not restricted to the rule of adding a prefix or removing a prefix from the destination number. Different set up of call-routing rules can be incorporated. These call-routing rules are not constant and may vary, according to their set up. In accordance with an embodiment of the invention, displaying module 304 is a graphical user interface that displays graphical representations of the set of results. In accordance with an embodiment of the invention, NMS 208 can be implemented in one of user devices 102, where user devices 102 will have its own functionality as well as the functionality of NMS 208.

Figure 4:
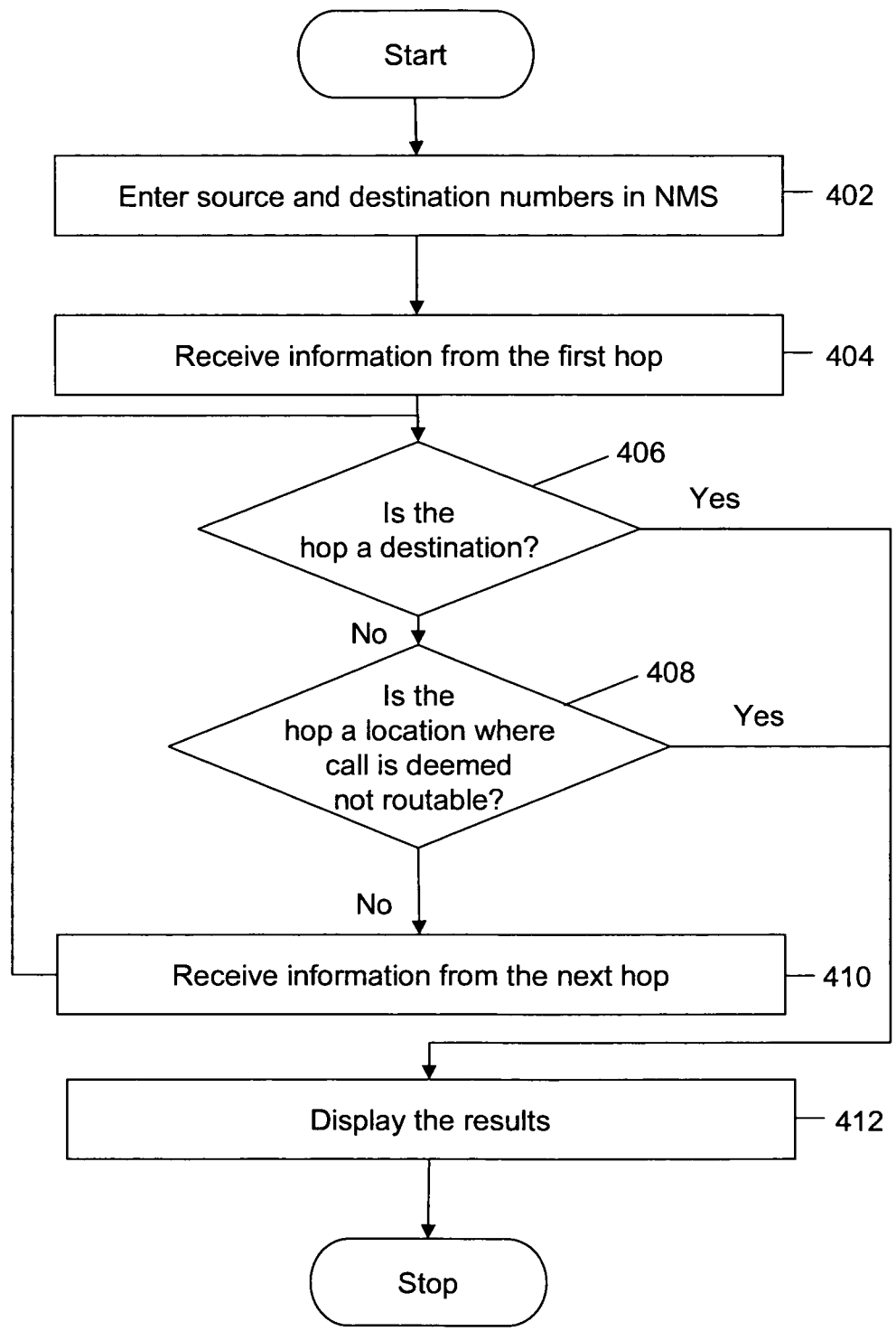
FIG. 4 is a flowchart illustrating the requisite steps for dial plan debugging, in accordance with various embodiments of the invention.

FIG. 4 is a flowchart illustrating the steps for dial plan debugging, in accordance with an embodiment of the invention. At step 402, the numbers of source 202 and destination 204 are entered in NMS 208 to identify the dial path of a call. NMS 208 determines the IP address of the call agent of first hop 206a. The IP address is determined by using a database look-up, which is populated by a discovery process. As described earlier, every hop implements a software module that accepts the source and destination numbers. The software module provides the transformed source and destination numbers to be presented to the next hop and the IP address of the next hop. The software module further provides details of the route patterns and associated data useful to identify the problems with the dial plan logic. At step 404, NMS 208 contacts the call agent of first hop 206a by using its IP address and receives information about the IP address of a next hop. At step 406, it is verified whether the hop, from which the information is received, is destination 204.

If the hop from which the information is received is not destination 204, step 408 is performed. At step 408, it is checked whether the hop, from which the information is received, is a node at which the call is deemed as not routable. The call is deemed as not routable when information related to a next hop from one of the plurality of hops 206a, 206b, 206c, and 206d cannot be received.

If the hop from which the call is deemed as not routable is not detected, step 410 is performed. At step 410, NMS 208 contacts the call agent of the next hop from one of the plurality of hops 206a, 206b, 206c, and 206d at the IP address and port. Information from the next hop is received. Further, steps 406 to 410 are repeated. The procedures carried out for first hop 206a are repeated for the next hop from the plurality of hops 206a, 206b, 206c, and 206d and are recursively continued until destination 204 or a hop from which the call is deemed as not routable is detected.

If at step 406 it is found that one of the plurality of hops 206a, 206b, 206c, and 206d, from which the information is received, is destination 204. Otherwise, if at step 408 it is found that the call is deemed as not routable, step 412 is performed. At step 412, all the results are collated and displayed at NMS 208. Therefore, the end-to-end picture of a path that a call may take is provided to a user. This can facilitate exposing the problems with dial plans at any call agent in the distributed network.

The results being displayed include the information received. The displayed information includes displaying the route pattern and associated data useful for locating the issue with dial plan logic. If the number is transformed into a URI, as in the case of H.323 to SIP interworking, the transformed number is also displayed. In an embodiment of the invention, the information is displayed immediately after receiving it at steps 404 and 410. Further, displaying the results may include displaying the cause of failure of a call.

Figure 5:
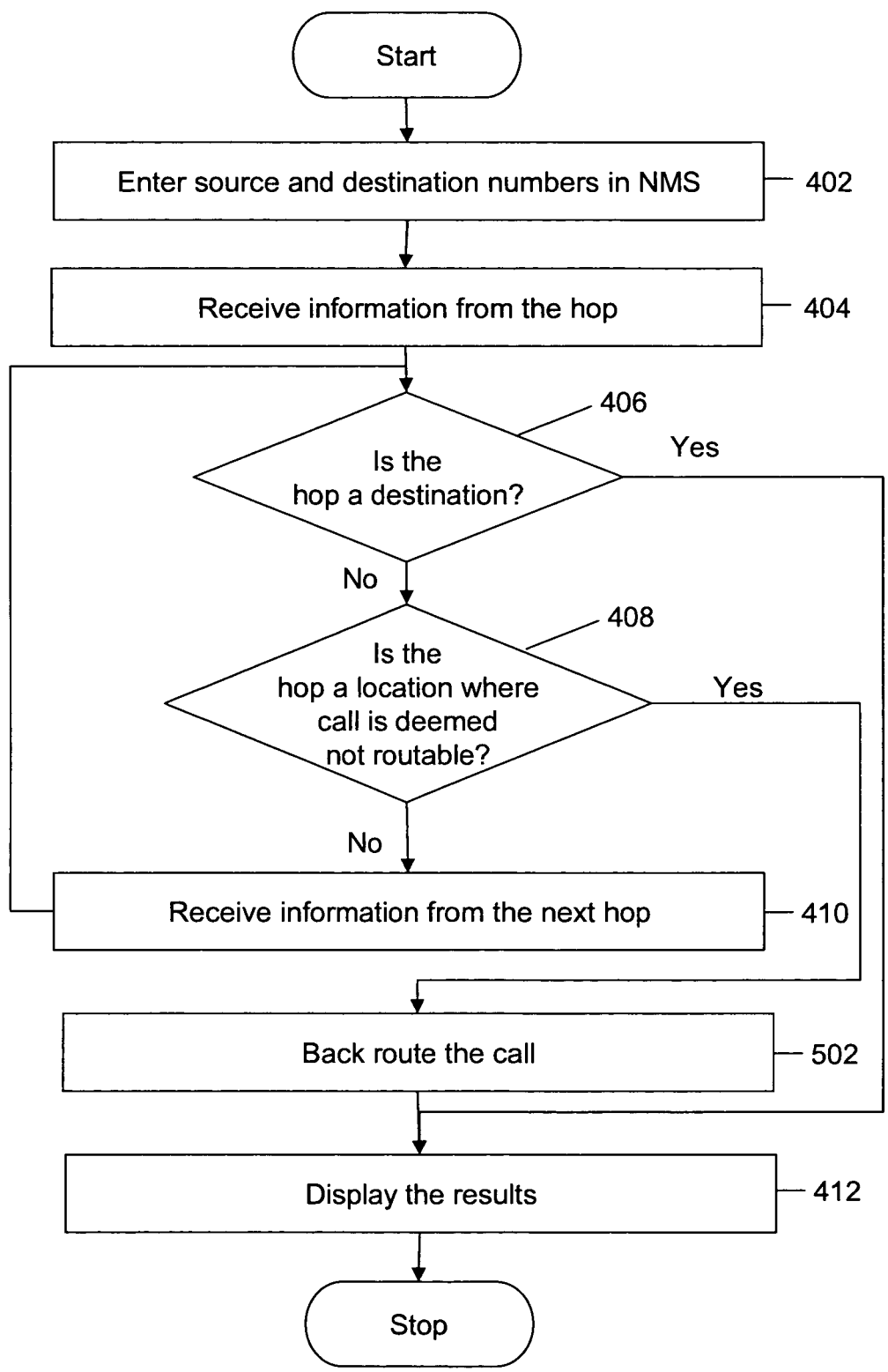
FIG. 5 is a flowchart illustrating the requisite steps involved in back routing calls, in accordance with an embodiment of the invention.

FIG. 5 is a flowchart illustrating the steps for back routing of a call, in accordance with an embodiment of the invention. Steps 402 to 410 are performed as described with reference to FIG. 4. However, at step 408, if one of the plurality of hops 206a, 206b, 206c, and 206d, from which the information is received, is a node from which it is deemed that the call is not routable, step 502 is performed. At step 502, the call, which is deemed not routable, is back routed to an alternative route. Back routing is facilitated as one of the plurality of hops 206a, 206b, 206c, and 206d, from which it is deemed that the call is not routable is known. Further, step 412 is performed as described with reference to FIG. 4.

Various embodiments of the invention can trace the path that a call will take. Set-up conditions can be created where some paths are deliberately brought down to identify if the dial plan makes use of alternative paths. For example, a set-up may have a primary IP network and a backup Public Switched Telephone Network (PSTN) implemented for making calls. In case the primary IP link is down, then the backup PSTN network can be utilized to make calls. To test the above set-up, the primary IP link could be deliberately brought down and the dial plan debugging can be performed. This can reveal if the dial plan rules are appropriate to take the call to the gateway connecting to the PSTN.

Embodiments of the invention provide a method and system that facilitate understanding why calling certain numbers fails. The provided display indicates one of the plurality of hops 206a, 206b, 206c, and 206d, at which the call is deemed not routable.

Various embodiments of the invention provide a method that enables automated hop-by-hop dial plan debugging. For this purpose, the information received from each of the plurality of hops 206a, 206b, 206c, and 206d is displayed.

Various embodiments of the invention may be implemented in large internetworks as well as in small networks. Embodiments of the invention can be used from a console, where a user can input a number and see a graphical representation of the path a call will take.

Further, various embodiments of the invention provide a user-friendly display of the results, to display the complete route pattern of the call. It can be implemented to test the dial path of a call that has not been initiated. When the dial path of a call that has not been initiated is known in advance, various preventive measures can be taken for successful completion of the call.

Further, various embodiments of the invention facilitate simulation of call failures by adding additional rules, to check the back routing of calls Although the invention has been discussed with respect to specific embodiments thereof, these embodiments are merely illustrative, and not restrictive, of the invention. For example, a 'method for dial plan debugging' can include any type of analysis, manual or automatic, to anticipate the needs of dial plan debugging.

Although specific protocols have been used to describe embodiments, other embodiments can use other transmission protocols or standards. The invention can operate between any two processes or entities including users, devices, functional systems, or combinations of hardware and software.

Any suitable programming language can be used to implement the routines of the invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention. Also in the description herein for embodiments of the invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the invention.

A 'computer readable medium' for purposes of embodiments of the invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for dial plan debugging in a network comprising a plurality of call agents, the method comprising:
   receiving, at a Network Management System (NMS), information for a source phone number and a destination phone number and an address of a first call agent, the source phone number corresponding to a source device, and the destination phone number corresponding to a destination device, wherein the first call agent is configured to receive a data packet from the source device;
   sending a correspondence from the NMS to the first call agent to determine another call agent in a plurality of call agents that the first call agent will forward the data packet;
   receiving information from the first call agent regarding the other call agent that the first call agent will forward the data packet;
   determining whether the other call agent is the destination device;
   upon determining that the other call agent is the destination, sending information from the NMS to the source device to inform the source device of a path of the data packet from the source device to the destination device, wherein sending information from the NMS to the source device regarding the path of the data packet occurs prior to the source device sending the data packet to the first call agent; and
   upon determining that the other call agent is not the destination device:
     performing the sending the correspondence to each call agent in the plurality of call agents and receiving information from the respective call agent in the plurality of call agents until one of the call agents indicates that a next call agent is the destination device.

2. The method of claim 1, wherein the information related to the other call agent comprises an Internet protocol (IP) address, a transformed source, and a destination phone number.

3. The method of claim 1, wherein a call is routed using a set of call routing rules, the set of call routing rules comprising a first rule for adding a first prefix and a second rule for removing a second prefix.

4. The method of claim 1, further comprising back routing the call when information regarding the other call agent is not receivable.

5. The method of claim 1, further comprising simulating failures of at least one of the call agents to check back routing of the call.

6. The method of claim 1 further comprising:
   upon determining that the other call agent is the destination device:
      displaying, in the NMS, a set of results in response to the other call agent being the destination device, the set of results including the received information from each call agent in the plurality of call agents that forwarded the data packet.

7. The method of claim 6, wherein the displaying the set of results comprises displaying details of a route pattern used for routing a call.

8. The method of claim 6, wherein the displaying the set of results comprises displaying each of the call agents in a call route for a call.

9. The method of claim 6, wherein the displaying the set of results comprises displaying a transformed number based on the destination phone number and a set of call routing rules, wherein the set of call routing rules is applied to a call.

10. The method of claim 9, wherein the transformed number comprises the destination phone number translated into one or more Uniform Resource Identifiers (URIs).

11. A system for dial plan debugging in a network comprising a plurality of call agents, the system comprising:
   a Network Management System (NMS) connected to a plurality of call agents, a source device and a destination device, the NMS configured to:
      receive, from the source device, information for a source phone number, a destination phone number and an address of a first call agent, the source phone number corresponding to a source device, and the destination phone number corresponding to a destination device, wherein the first call agent is configured to receive a data packet from the source device;
      send a correspondence to the first call agent to determine another call agent in a plurality of call agents that the first call agent will forward the data packet;
      receive information from the first call agent regarding the other call agent that the first call agent will forward the data packet;
      determine whether the other call agent is the destination device;
      upon determining that the other call agent is the destination, send information from the NMS to the source device to inform the source device of a path of the data packet from the source device to the destination device, wherein the sending of the information from the NMS to the source device regarding the path of the data packet occurs prior to the source device sending the data packet to the first call agent; and
      upon determining that the other call agent is not the destination device:
         performing the sending the correspondence to each call agent in the plurality of call agents and receiving information from the respective call agent in the plurality of call agents until one of the call agents indicates that a next call agent is the destination device; and
      the plurality of call agents.

12. The system of claim 11, wherein the display module is configured to display details of a route pattern used for routing a call.

13. The system of claim 11, wherein the display module is configured to display each of the call agents in the path.

14. The system of claim 11, wherein the display module is configured to display:
   a transformed number based on the destination phone number and a set of call routing rules, wherein the transformed number is the destination phone number translated into one or more Uniform Resource Identifiers (URIs).

15. The system of claim 11, further comprising a display module that comprises a graphical user interface (GUI) coupled to a user interface module.

16. The system of claim 11, wherein the NMS further comprises:
   a user interface (UI), upon determining that the other call agent is the destination device, configured to display a set of results in response to the other call agent being the destination device, the set of results including the received information from each call agent in the plurality that forwarded the data packet,
   wherein the call agents are configured to:
      receive the data packet;
      receive the correspondence from the NMS to determine another call agent in the plurality of call agents that the first call agent will forward the data packet;
      determine the other call agent in the plurality of call agents that the data packet will be forwarded; and
      send information to the NMS regarding the other call agent that the data packet will be forwarded.

17. A non-transitory computer readable storage medium including instructions executable by a processor for dial plan debugging in a network comprising a plurality of call agents, the non-transitory computer readable storage medium comprising:
   at least one instruction for receiving, at a Network Management System (NMS), information for a source phone number and a destination phone number and an address of a first call agent, the source phone number corresponding to a source device, and the destination phone number corresponding to a destination device, wherein the first call agent is configured to receive a data packet from the source device;
   at least one instruction for sending a correspondence from the NMS to the first call agent to determine another call agent in a plurality of call agents that the first call agent will forward the data packet;
   at least one instruction for receiving information from the first call agent regarding the other call agent that the first call agent will forward the data packet;
   at least one instruction for determining whether the other call agent is the destination device;
   upon determining that the other call agent is the destination, at least one instruction for sending information from the NMS to the source device to inform the source device of a path of the data packet from the source device to the destination device, wherein the sending information from the NMS to the source device regarding the path of the data packet occurs prior to the source device sending the data packet to the first call agent; and upon determining that the other call agent is not the destination device:
  instructions for performing the sending the correspondence to each call agent in the plurality of call agents and receiving information from the respective call agent in the plurality of call agents until one of the call agents indicates that a next call agent is the destination device.

* * * * *